US006953900B2

(12) United States Patent
Sottong

(10) Patent No.: US 6,953,900 B2
(45) Date of Patent: Oct. 11, 2005

(54) MULTIFUNCTIONAL SWITCH

(75) Inventor: Sascha Sottong, Eckenroth (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/478,091

(22) PCT Filed: May 10, 2002

(86) PCT No.: PCT/DE02/01687

§ 371 (c)(1),
(2), (4) Date: Nov. 18, 2003

(87) PCT Pub. No.: WO02/095781

PCT Pub. Date: Nov. 28, 2002

(65) Prior Publication Data

US 2004/0144628 A1 Jul. 29, 2004

(30) Foreign Application Priority Data

May 18, 2001 (DE) .......................... 101 24 246

(51) Int. Cl.$^7$ ................................ H01H 9/26
(52) U.S. Cl. ..................... 200/5 R; 200/5 A
(58) Field of Search ................ 200/5 A, 5 E, 200/5 R, 4, 18, 6 A, 329, 510–520, 85 A, 336, 17 R, 277, 11 E, 11 TW

(56) References Cited

U.S. PATENT DOCUMENTS

| | | | | |
|---|---|---|---|---|
| 4,075,443 A | * | 2/1978 | Fatur ........................... 200/85 A |
| 4,473,724 A | * | 9/1984 | Suzuki ........................ 200/5 R |
| 4,678,872 A | * | 7/1987 | Gutman ....................... 200/5 R |
| 4,695,682 A | * | 9/1987 | Winogrocki ................. 200/5 R |
| 4,795,865 A | * | 1/1989 | Howard ....................... 200/85 A |
| 4,861,949 A | * | 8/1989 | Bortolloni et al. ........... 200/5 R |
| 5,047,596 A | * | 9/1991 | Ebishi ............................. 200/4 |
| 5,111,006 A | * | 5/1992 | Doke et al. .................. 200/5 R |
| 5,128,500 A | * | 7/1992 | Hirschfeld ................... 200/5 R |
| 5,140,235 A | * | 8/1992 | Ahmed et al. ............... 318/286 |
| 5,151,563 A | * | 9/1992 | Tanaka ......................... 200/6 A |
| 5,278,363 A | * | 1/1994 | Krieg et al. .................. 200/5 R |
| 5,340,935 A | * | 8/1994 | Anderson et al. ........... 536/23.5 |
| 5,384,440 A | * | 1/1995 | Wnuk et al. ................. 200/5 R |
| 5,424,502 A | * | 6/1995 | Williams ..................... 200/85 A |
| 5,481,078 A | * | 1/1996 | Asche ......................... 200/85 A |
| 5,866,862 A | * | 2/1999 | Riffil et al. .................. 200/5 R |
| 6,040,533 A | * | 3/2000 | Wagner ....................... 200/5 A |
| 6,080,942 A | * | 6/2000 | Sasaki ......................... 200/17 R |
| 6,339,302 B1 | * | 1/2002 | Greenbank et al. ......... 318/103 |
| 6,457,545 B1 | * | 10/2002 | Michaud et al. ............. 180/272 |
| 6,515,241 B2 | * | 2/2003 | Saiki ............................ 200/5 R |
| 6,580,039 B2 | * | 6/2003 | Nakade et al. .............. 200/6 A |
| 6,689,974 B2 | * | 2/2004 | Guillot ....................... 200/85 A |
| 6,720,504 B2 | * | 4/2004 | Nishimoto et al. ............. 200/4 |

FOREIGN PATENT DOCUMENTS

| | | | |
|---|---|---|---|
| DE | 3524439 | | 1/1987 |
| DE | 4033129 | | 4/1992 |
| DE | 19610344 | | 9/1997 |
| DE | 19756052 | | 7/1999 |
| DE | 100 02 493 | * | 1/2000 |
| DE | 100 35 206 | * | 7/2000 |
| DE | 19946021 | | 11/2000 |
| DE | 198 44 333 | * | 9/2004 |

* cited by examiner

*Primary Examiner*—Elvin Enad
*Assistant Examiner*—Lisa Klaus
(74) *Attorney, Agent, or Firm*—David P. Wood

(57) ABSTRACT

A multifunctional switch, especially a keyed seat adjusting switch, includes an actuating element which is positioned in a rotational manner and can be displaced in a crosswise manner in a housing which has associated switch contacts for acting on connection contacts and in which the switch contact associated with the rotational movement is integrated. A reversing lever co-operating with actuators and positioned on the housing side, is associated with the actuating element for each of its displacement directions in order to act on the corresponding switch contacts. The actuating element co-operates with the reversing levers by means of an axial guide flange.

14 Claims, 4 Drawing Sheets

MULTIFUNCTIONAL SWITCH

BACKGROUND OF THE INVENTION

The invention generally relates to electrical switches and more particularly relates to momentary-contact seat-adjustment switches.

An electrical momentary-contact switch with an actuating element that is arranged in a housing so that it can be turned and displaced crosswise is known from the prior art. The actuating element cooperates with three slide-type switching elements that respectively contain two spring-loaded contact rollers for acting upon strip contacts, wherein the strip contacts are realized in the form of stamped grids. The stamped grid is embedded in a base and contains terminal contacts. The longitudinal sides of the essentially rectangular slide-type switching elements are aligned parallel to one another in the housing and contain projections that engage with the actuating element. Here, the central slide-type switching element is guided on two ridges on the housing side, such that it can be displaced back and forth in a first travel direction. The central slide-type switching element is not affected when the actuating element is turned. The two outer slide-type switching elements are also guided by ridges on the housing side which are aligned perpendicularly to the ridges for the central slide-type switching element and can be displaced in a second travel direction of the actuating element that extends perpendicularly to the first travel direction. The two outer slide-type switching elements are displaced in mutually opposite directions when the actuating element is turned. The two outer slide-type switching elements are spring-loaded with respect to the housing in order to hold the actuating element and the slide-type switching elements in an idle position. The arrangement of the slide-type switching elements makes it impossible to act upon the strip contacts by simultaneously turning and displacing the actuating element.

DE 196 10 344 A1 discloses a multifunction operating device for a motor vehicle which serves for the selection of menus and/or functions and contains an operating element that can be actuated axially and rotatably, where a complete function is activated by axially displacing the operating element. The operating element cooperates with contact elements and is arranged such that it can be transversely displaced within at least one plane that contains the axis of the operating element. Menus and/or functions are assigned to the contact positions of the operating element along its transverse travel path within said plane.

DE 40 33 129 A1 discloses a switching device with an actuating element that contains a stationary contact arrangement and a movable contact arrangement. In this case, contacts of the movable contact arrangement are displaced and act upon contacts of the stationary contact arrangement when the actuating element is displaced or turned. The stationary contact arrangement and the movable contact arrangement are respectively located in one plane. The contacts of the movable contact arrangement are combined in groups of three and mechanically coupled to the actuating element.

DE 35 24 439 A1 and DE 197 56 052 A1 respectively disclose a multifunction switch for adjusting the mirrors of a motor vehicle, wherein these multifunction switches contain an actuating element that is supported such that can be pivoted like a universal joint and turned.

BRIEF SUMMARY OF THE INVENTION

The invention is based on the problem of developing a multifunction switch of the initially mentioned type which has a compact design and makes it possible to act upon terminal contacts by simultaneously turning and displacing the actuating element.

According to the invention, this problem is solved in that a guide lever that is supported on the housing side and cooperates with actuators is assigned to the actuating element for each of its travel directions, wherein said guide levers serve to act upon corresponding switching contacts, and wherein the actuating element cooperates with the guide levers by means of an axial guide projection.

Since the switching contact that acts upon assigned terminal contacts when the actuating element is turned is functionally separated from the switching contact assigned to the travel directions, it is ensured that the terminal contacts are acted upon by the switching contacts when the actuating element is simultaneously turned and displaced. In addition, the electrical momentary-contact switch realized in the form of a multifunction switch has a relatively simple and robust design.

The switching contact that is integrated into the actuating element is preferably realized in the form of a contact roller that is supported in a spring-loaded fashion in the actuating element on the side that faces the housing and acts upon strip contacts of a torsionally rigid printed-circuit board that contains the terminal contacts. The direct assignment of the contact roller to the actuating element ensures that the terminal contacts are acted upon when the actuating element is turned, independently of the position into which the actuating element is displaced.

The printed-circuit board contains depressions in order to make it possible to act upon the terminal contacts without noise when the actuating element is turned to a given switching position, wherein contact projections of the contact roller for contacting the terminal contacts lie in said depressions in one of the switching positions.

According to an advantageous embodiment of the invention, the contact roller passes through an intermediate ring that carries at least one spring-loaded catch sleeve that cooperates with a cam plate on the end surface of the actuating element which points in the direction of the housing. The interaction between the at least one spring-loaded catch sleeve and the cam plate causes the actuating element to return to its idle position after it was turned. This also generates a palpable resistance when the user attempts to turn the actuating element.

In order to achieve a compact design of the actuating element and the components required for the switching processes when the actuating element is turned, the invention advantageously proposes that the printed-circuit board be held in the intermediate ring by a carrier plate with clip arms that cooperate with the actuating element. The actuating element is rotatably supported by the clip arms of the carrier plate.

In order to realize an arrangement of the carrier plate, the printed-circuit board and the intermediate ring coupled to the carrier plate in the housing that is without rotational play, the carrier plate preferably contains projections that pass through an assigned housing wall, as well as a centering sleeve, and engage into corresponding recesses of a torsionally rigid mating plate.

According to an advantageous additional development of the invention, the mating plate contains the cylindrical guide projection that points in the direction of a base and movably engages into a slot of a holding plate. This means that the actuating element is reliably guided in the first of its two transverse travel directions due to the engagement of the guide projection into the slot.

In order to also realize the second moving travel of the actuating element by relatively simple means, the holding plate overlaps the mating plate and is supported on the housing side such that it can be displaced in a direction that extends perpendicularly to the slot.

According to another advantageous embodiment of the invention, the guide levers are realized at an angle and are pivotably supported in a carrier that is fixed on the housing side, where one arm of each guide lever joins the guide projection of the mating plate and the other arm lies on the assigned actuator. The guide levers convert the sliding motion of the actuating element into a motion for acting upon the switching contacts which is directed perpendicularly to the sliding motion.

In order to precisely fix the guide levers in position, the corner points formed by the legs of the guide levers are preferably provided with opposing pivot projections that overlap the assigned pivot pins of the carrier.

In order to prevent the pivot projections of the guide levers and the pivot pins of the carrier from being subjected to high lateral forces, the legs of the guide levers which are assigned to the guide projection of the mating plate advantageously lie in recesses of the carrier.

The legs of the guide levers which are assigned to the actuators preferably lie in actuator recesses in order to fix the actuators horizontally.

The actuators preferably are also fixed in position in that they are held between prestressed domes of a switching substrate together with the switching contacts and the assigned legs of the guide levers. This means that no additional mounting elements are required for holding the actuators.

The base advantageously fixes a contact plate relative to the switching substrate and presses the domes with the actuators lying on it against the corresponding legs of the guide levers with a certain amount of prestress. In this case, the switching contacts accommodated in the domes are moved such that they lie on the terminal contacts of the contact plate when the guide levers are pivoted.

Needless to say, the previously discussed characteristics as well as the characteristics yet to be disclosed below can be used not only in the respectively described combination, but also in other combinations without deviating from the scope of the present invention.

DETAILED DESCRIPTION OF THE INVENTION

Figure 1:
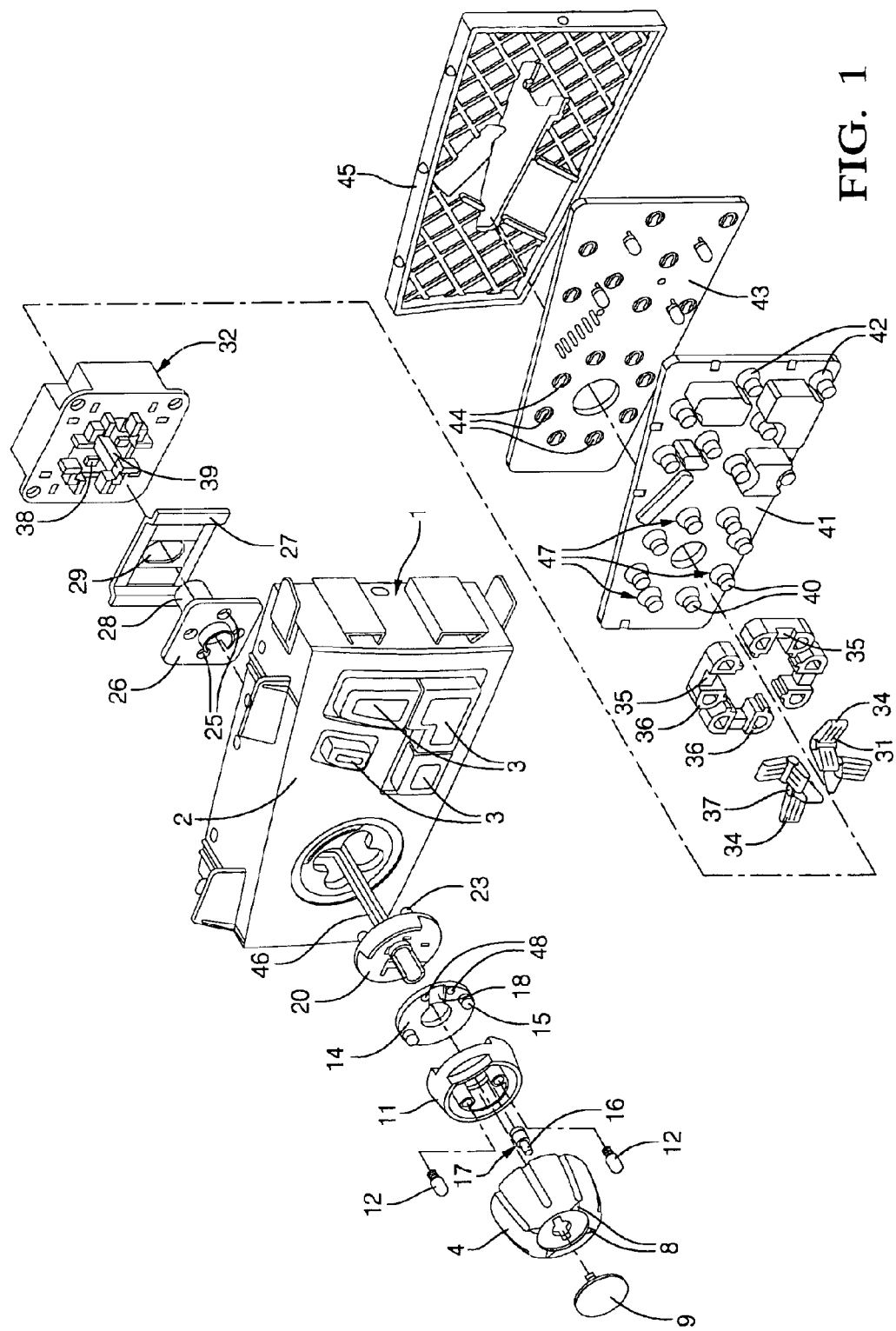
FIG. 1, an exploded view of the multifunction switch according to the invention.
Figure 2:
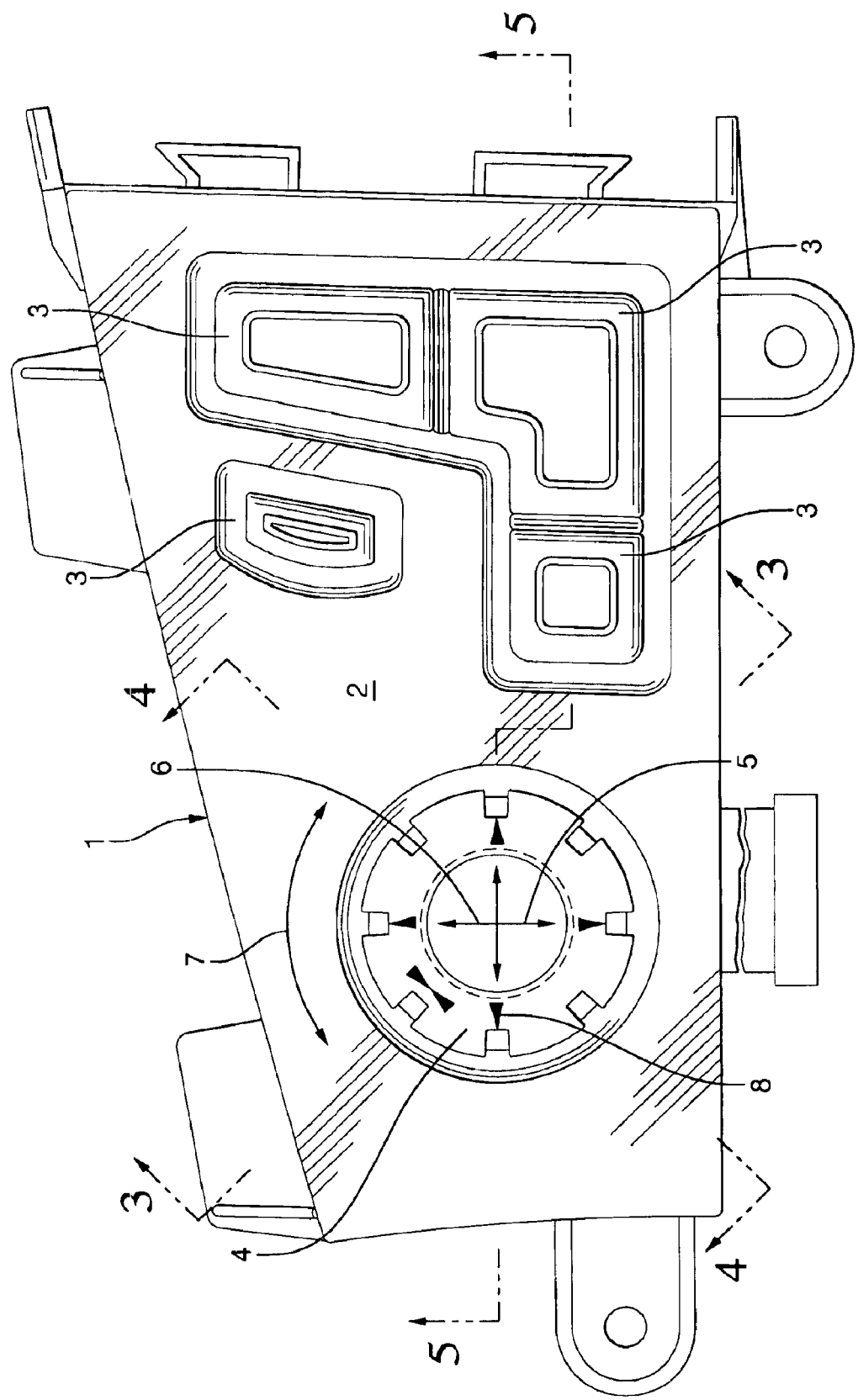
FIG. 2, a top view of the multifunction switch according to FIG. 1.
Figure 3:
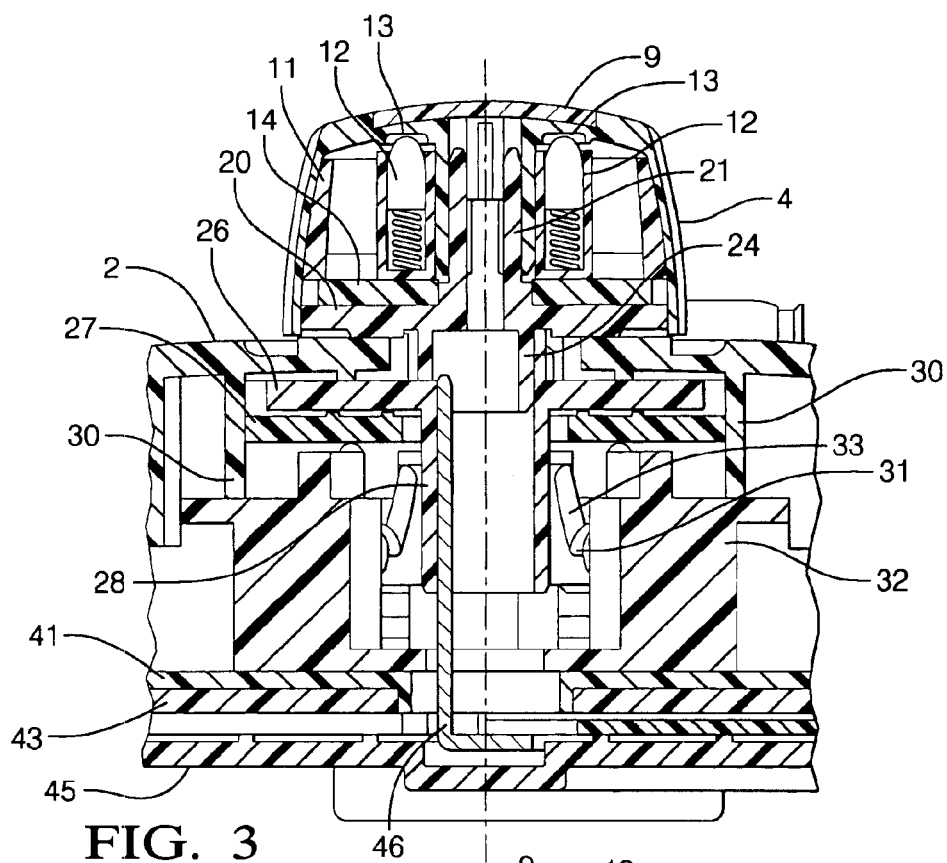
FIG. 3, a section along line III—III in FIG. 2.
Figure 4:
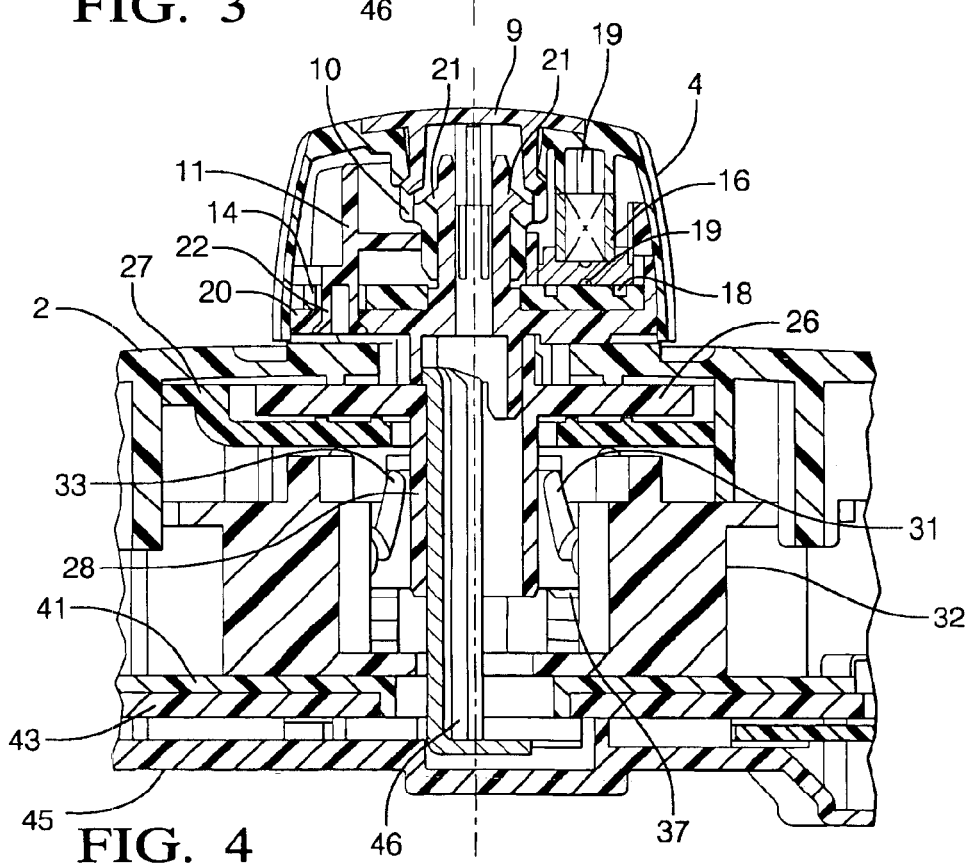
FIG. 4, a section along line IV—IV in FIG. 2.
Figure 5:
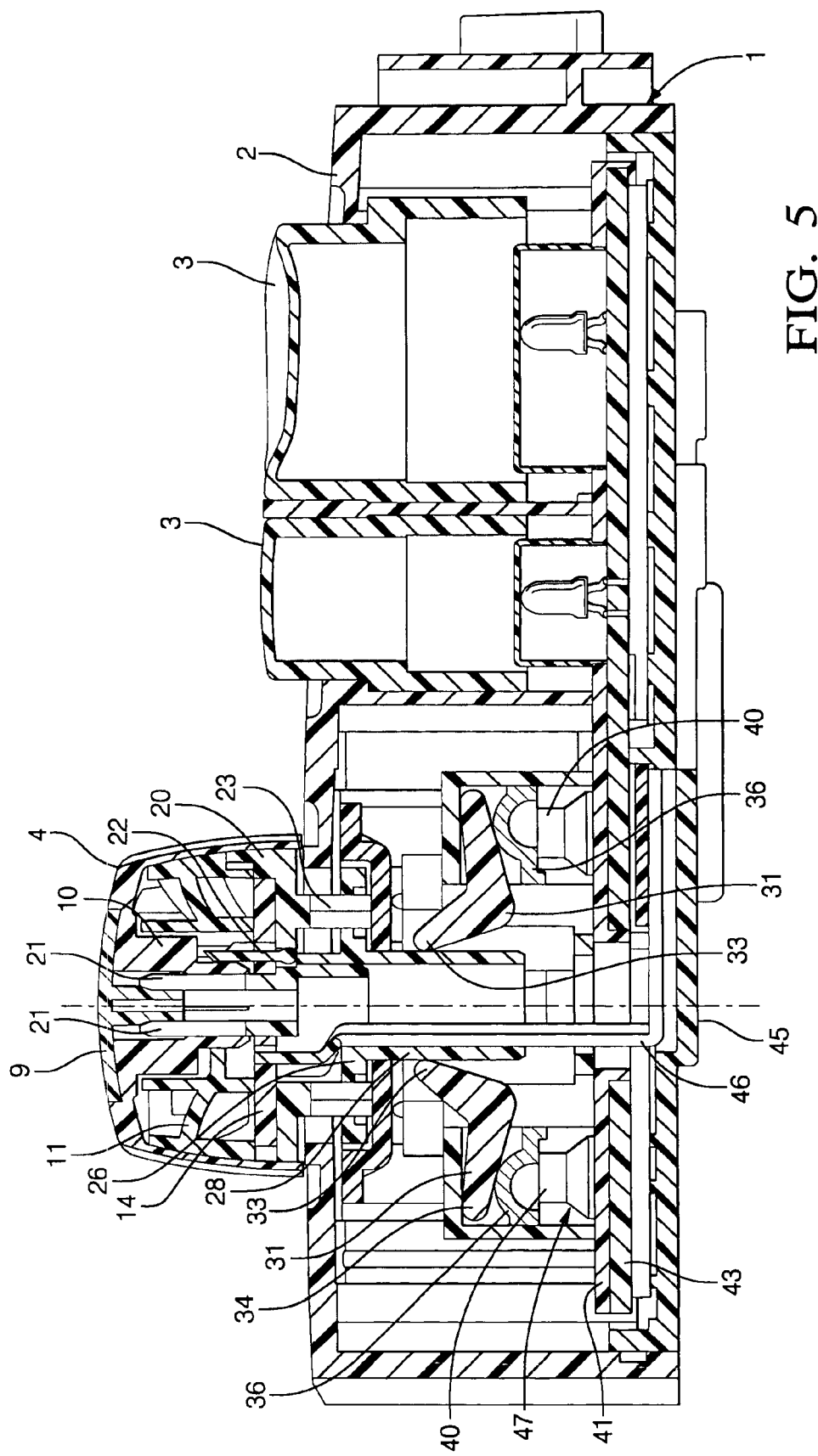
FIG. 5, a section along line V—V in FIG. 2.

Now referring to FIG. 1, the multifunction switch in the form of a momentary-contact switch comprises a housing 1, into the upper housing wall 2 of which an actuating element 4 is inserted adjacent to pushbotton switches 3, wherein said actuating element can be displaced transversely, as indicated by the double arrows 5, 6 and turned as indicated by the double arrow 7. The end surface of the actuating element 4 is provided with symbols 8 that can be backlit in order to provide a visual aid for the operation of the actuating element. In addition, a cover 9 is snapped into the free end surface of the actuating element 4.

On the opposite side of the cover 9, the actuating element 4 is provided with a centrally arranged guide sleeve 10 that fixes an intermediate ring 11. The intermediate ring 11 carries two spring-loaded catch sleeves 12 that are separated and that cooperate with a cam plate 13 of the actuating element 4, which extends section-wise around the guide sleeve 10. The intermediate ring 11 is realized in sections in the form of a reflector with two assigned light-emitting diodes 15 that are arranged on a printed-circuit board 14 and that serve to backlight the symbols 8 of the actuating element 4.

A switching contact 17 in the form of a contact roller 16 is arranged in the actuating element 4 in order to turn the actuating element, as indicated by the double arrow 7. The contact roller 16 is supported in spring-loaded fashion in the actuating element 4 on the side that faces the housing wall 2 and acts upon terminal contacts 48 of the printed-circuit board 14. In order to ensure reliable contacts in the corresponding switching positions, the printed-circuit board 14 contains depressions 18, in which contact projections 19 of the contact roller 16 for acting upon the terminal contacts 48 lie in one of the switching positions. The printed-circuit board 14 is held in the intermediate ring 11 by a carrier plate 20.

The carrier plate 20 contains clip arms 21 for simultaneously fixing and rotatably supporting the actuating element 4, wherein said clip arms engage with the guide sleeve 10 of the actuating element 4. The intermediate ring 11 is provided with clip arms 22 that engage with the carrier plate 20 in order to fix the printed-circuit board 14 and the carrier plate. In order to hold the intermediate ring 11 and the printed-circuit board 14 without rotational play, the carrier plate 29 of the holding plate 27. The holding plate 27 overlaps the mating plate 26 and is guided between ridges 30 on the housing side such that it can be moved as indicated by the double arrow 5.

Four angular guide levers 31 are supported on the cylindrical guide projection 28 of the mating plate 26, wherein said guide levers are arranged in a carrier 32 that is mounted on the housing side so that they can be pivoted transversely relative to one another. One guide lever 31 is assigned to each travel direction of the actuating element 4 indicated by the double arrows 5, 6. The guide levers 31 respectively join the guide projection 28 of the mating plate 26 with one leg 33, where the other leg 34 lies in a recess 35 of an actuator 36 for assigning switching contacts 37. Opposing pivot projections 37 that overlap assigned pivot pins 38 of the carrier 32 are integrally formed onto the guide levers 31 that are assigned which is formed by the two legs 33, 34. The legs 33 of the guide levers 31 that are assigned to the cylindrical guide projection 28 of the mating plate 26 also lie in recesses 39 of the carrier 32.

The switching contacts 47 assigned to the actuators 36 are arranged in domes 40 of a switching substrate 41, additional domes 42 of which accommodate switching contacts for the pushbotton switches 3. The switching substrate 41 lies on the contact plate 43 with the terminal contacts 44 assigned to the switching contacts 47, where the contact plate, in turn, is held by the base 45. The domes 40 are presented relative to the actuators 36 in order to fix the actuators 36 horizontally, where said prestress holds the actuators on the assigned legs 34 of the guide levers 31.

When displacing the actuating element 4 in one of the directions indicated by the double arrows 5, 6, the corresponding guide levers 31 is pivoted by the guide projection 28 of the mating plate 26, and the assigned actuator 36 acts upon two domes 40 of the switching substrate 1 until the corresponding switching contacts 47 contact the terminal contacts 44 of the contact plate 43. At the same time, it is also possible to turn the actuating element 4 in one of the directions indicated by the double arrow 7. Here, the contact roller 16 assigned to the actuating element 4 contacts the terminal contacts 48 of the printed-circuit board 14 that is connected to plug-type contacts for the on-board network via lines 46. After having been displaced and released, the actuating element 4 is automatically returned into the idle position, due to the resetting of the domes 40 of the switching substrate 41 which act upon the guide projection 28 of the mating plate 26 by means of the assigned guide lever 31, so that the actuating element 4 is moved back into the idle position. The return of the actuating element 4 into the idle position from a turned position is achieved due to the cooperation of the spring-loaded sleeves 12 and the cam plate 13 of the actuating element 4.

LIST OF REFERENCE SYMBOLS

1 Housing
2 Housing wall
3 Pushbutton switch
4 Actuating element
5 Double arrow
6 Double arrow
7 Double arrow
8 Symbol
9 Cover
10 Guide sleeve
11 Intermediate ring
12 Catch sleeve
13 Car plate
14 Printed-circuit board
15 Light-emitting diode
16 Contact roller
17 Switching contact
18 Depression
19 Contact projection
20 Carrier plate
21 Clip arm
22 Clip arm
23 Projection
24 Centering sleeve
25 Recess
26 Mating plate
27 Holding plate
28 Guide projection
29 Slot
30 Web
31 Guide lever
32 Carrier
33 Leg
34 Leg
35 Recess
36 Actuator
37 Pivot projection
38 Pivot pin
39 Recess
40 Dome
41 Switching substrate
42 Dome
43 Contact plate
44 Terminal contact
45 Base
46 Line
47 Switching contact
48 Terminal contact

What is claimed is:

1. A momentary-contact switch, comprising:
    an actuating element arranged in a housing and adapted for turning and transverse displacement relative to said housing, wherein the actuating element cooperates with a first and second switching contacts for acting upon terminal contacts, and wherein said a first switching contact is assigned to the turning motion, and wherein said a first switching contact is integrated with the actuating element,
    a plurality of guide levers supported on the housing, wherein the plurality of guide levers cooperate with a plurality of actuators and wherein said guide levers are assigned to the actuating element, wherein said guide levers act upon said second switching contacts, and wherein the actuating element cooperates with said plurality of guide levers by means of an axial guide projection.

2. Momentary-contact switch according to claim 1, wherein the first switching contact, which is integrated with the actuating element, is realized in the form of a contact roller that is supported in spring-loaded fashion a side of the actuating element that faces the housing and wherein the roller acts upon strip contacts of a torsionally rigid printed-circuit board that contains said terminal contacts.

3. Momentary-contact switch according to claim 2, wherein the printed-circuit board contains depressions for engaging contact projections of the contact roller.

4. Momentary-contact switch according to claim 2, wherein the contact roller passes through an intermediate ring that carries at least one spring-loaded catch sleeve, wherein said catch sleeve cooperates with a cam plate on an end surface of the actuating element.

5. Momentary-contact switch according to claim 4, wherein the printed-circuit board is held in the intermediate ring by a carrier plate with clip arms that cooperate with the actuating element.

6. Momentary-contact switch according to claim 5, wherein the carrier plate contains projections that pass through a wall of the housing and engage with corresponding recesses of a mating plate without rotational play.

7. Momentary-contact switch according to claim 6, wherein the mating plate contains a cylindrical guide projection that points in the direction of a base member and movably engages with a slot of a holding plate.

8. Momentary-contact switch according to claim 7, wherein the holding plate overlaps the mating plate and is supported on the housing movable in a direction perpendicular to the slot.

9. Momentary-contact switch according to claim 7, wherein the guide levers are formed at an angle and are pivotably supported in a carrier that is fixed on the housing, wherein one leg of each guide lever joins a guide projection of the mating plate and another leg of each guide lever lies on one of the plurality of actuators.

10. Momentary-contact switch according to claim 9, wherein the guide levers contain opposing pivot projections on corner points formed by said legs, wherein said pivot projections overlap assigned pivot pins of the carrier.

11. Momentary-contact switch according to claim 9, wherein some of the legs of the guide levers which are assigned to the guide projection of the mating plate lie in recesses of the carrier.

12. Momentary-contact switch according to claim 9, wherein some of the legs of the guide levers which are assigned to the actuators lie in recesses of the actuators.

13. Momentary-contact switch according to claim 1, wherein said plurality of actuators are held between prestressed domes of a switching substrate that contains the switching contacts and legs of the plurality of guide levers.

14. Momentary-contact switch according to claim 13, wherein a base fixes a contact plate relative to the switching substrate and presses the domes with the actuators lying thereon against the legs of the plurality of guide levers with a certain amount of prestress, wherein the switching contacts accommodated in the domes come in contact with terminal contacts of the contact plate when the guide levers are pivoted.

* * * * *